United States Patent
Cedarberg, III

[11] Patent Number: 5,921,561
[45] Date of Patent: Jul. 13, 1999

[54] COLLET ASSEMBLY

[75] Inventor: John F. Cedarberg, III, Eagan, Minn.

[73] Assignee: Cedarberg Industries, Inc., Eagan, Minn.

[21] Appl. No.: 08/806,308

[22] Filed: Feb. 26, 1997

[51] Int. Cl.[6] ................................................ B23B 31/20
[52] U.S. Cl. ................................ 279/50; 279/54; 279/57
[58] Field of Search ................................. 279/43, 50, 54, 279/55, 57, 43.2, 46.6, 46.3

[56] References Cited

U.S. PATENT DOCUMENTS

| | | | |
|---|---|---|---|
| 668,286 | 2/1901 | Freese | 279/43 |
| 2,138,012 | 11/1938 | Perr | 279/50 |
| 2,438,797 | 3/1948 | Bagge | 279/46.3 |
| 3,411,796 | 11/1968 | Decker | 279/46.6 |
| 3,549,159 | 12/1970 | Kroener | 279/53 |
| 4,681,056 | 7/1987 | Friedle et al. | 279/43 |

*Primary Examiner*—Steven C. Bishop
*Attorney, Agent, or Firm*—Haugen Law Firm PLLP

[57] ABSTRACT

The present invention is a collet assembly with a sliding lock. The assembly includes a segmented tubular body with the segments being increasing in size from one end of the body to the other. The two smallest segments form a plug for securing the collet assembly to a first object. The two larger segments form a collet which receives a second object. The collet has a tapered cross-sectional area, with the area decreasing from the end of the collet assembly towards the middle of the collet assembly. The collet includes longitudinal slots that extend from the end towards the middle of the collet assembly. The collet may include a sleeve in its bore. Like the collet, the sleeve has a plurality of longitudinal slots. The collet assembly also includes a slidable tubular collet lock having a passageway for receiving said collet therethrough. The passageway is also tapered with a first cross-sectional area at one end tapering to a smaller second cross-sectional area at its other end approximate the middle of the collet assembly. The taper of collet lock is less than the collet. By moving the collet lock over the collet, the collet and sleeve are compressed due to the camming action between the collet and collet lock thus holding the second object therein.

6 Claims, 2 Drawing Sheets

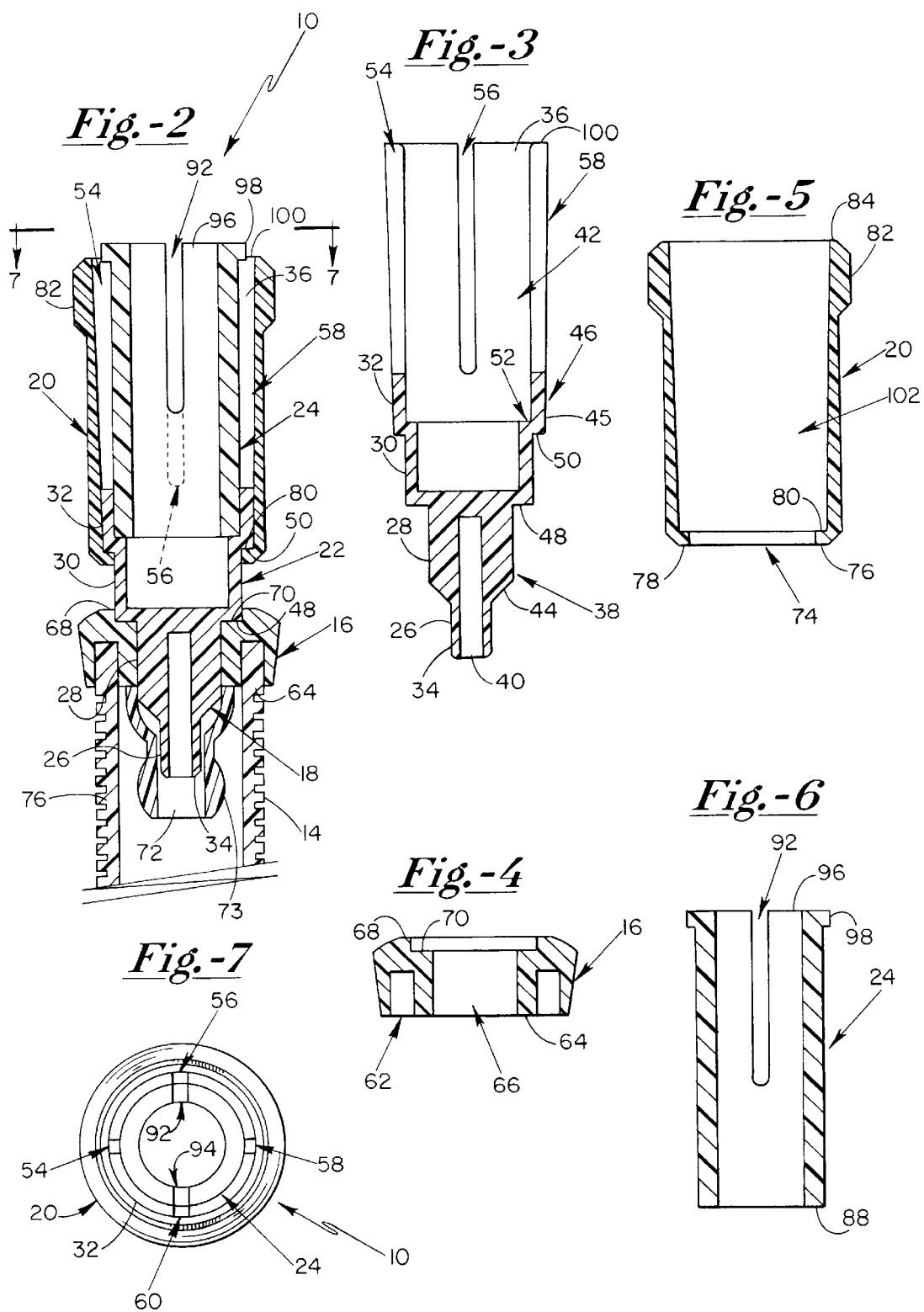

COLLET ASSEMBLY

I. FIELD OF THE INVENTION

This invention relates generally to a collet assembly and more importantly to a collet assembly with a sliding lock assembly for quickly securing or releasing an item.

II. DISCUSSION OF THE PRIOR ART

It has been known to use a collet and chuck arrangement for securing work pieces such as a rod while it is machined or to grip a generally cylindrical member of a tool such as a drill bit. The chuck surrounds the collet and operates by clamping the collet to the work piece. For example, with a rotary tool, the collet has a central throughbore, a single diameter shank portion with a threaded end and a frusto-conical portion at the end opposite the threaded end. A plurality of slots extend to the throughbore such that the collet will flex inward to grip the work piece when a tapered camming surface is moved over the collet. A threaded nut may be provided with a conical camming surface which matches a conical surface of the outer collet face to cause the inward flexing when the nut is rotated in the proper direction.

The tool to be secured is inserted into the collet throughbore and the nut is tightened causing the collet to collapse and grip the tool. The drive spindle or chuck of the machine is held stationary in order to tighten the nut sufficiently. Rotating the nut or similar securing device in a chuck and collet assembly is a time consuming procedure. Further the chuck and collet arrangements are complicated because of the need to properly and axially align the work piece and to have a threaded member. Thus, a need exists for a cost effective device that readily attaches and releases a cylindrical member and does not require a threaded member.

SUMMARY OF THE INVENTION

The present invention is an apparatus for securing a first object with a generally cylindrical member through use of a collet assembly to a second object. The collet assembly is generally tubular in shape with four segments, each having a different cross-sectional area. The smallest cross-sectional area segment is at a first end and each successive segment increases in cross-sectional area. The two smallest cross-sectional area segments form a plug. This plug is used to join the collet assembly to the second object. An annular end cap surrounds the exterior of the plug and further secures the collet assembly to the device.

Opposite the plug is a collet formed by the two larger segments. The collet receives the first object in its bore. The collet has four radially spaced apart longitudinal slots extending through the collet wall into the collet bore. The largest cross-sectional area segment tapers from a first cross-sectional area at its open end opposite the bore to a smaller cross-sectional area at the end adjacent to the second largest cross-sectional area segment. The collet bore cross-sectional area is not tapered. Positioned within the collet bore is a tubular collet sleeve having a cross-sectional area slightly smaller than the collet bore, allowing the sleeve to be press fit into the bore. The collet sleeve has two radially spaced apart longitudinal slots extending through its wall in its bore.

A tubular collet lock is positioned over the exterior of collet. The length of the collet lock is approximately the same as the largest cross-sectional area segment. The collet lock tapers from a first cross-sectional area at its open end surrounding the collet open end to a smaller cross-sectional area at its second end. The second end surrounds the second largest segment. The taper of the collet lock is less than the collet taper. The second end of the collet lock has an opening sized between the perimeters of the two segments forming the collet. This enables the collet lock opening to slide along the length of the second largest segment from an unlocked position adjacent to the end cap to a locked position adjacent to the largest segment.

In use, the first object to be joined with the collet is inserted in the collet sleeve. The collet lock is then slid towards the largest segment. As it is moved, the tapered collet lock compresses the larger cross-sectional area collet and collet sleeve about the first object to secure it therein. The collet lock stops once it can no longer move because of the difference in tapers between the collet and collet lock and the size of object held in the collet. The first object is released from the collet by sliding the collet lock towards the end cap of the collet assembly.

DESCRIPTION OF THE DRAWINGS

The foregoing features, objects and advantages of the invention will become apparent to those skilled in the art from the following detailed description of the preferred embodiment, especially when considered in conjunction with the accompanying drawings in which:

FIG. 2 is a cross-sectional view of the present invention along its length showing the invention in its locked position;

FIG. 3 is a cross-sectional view of the collet of the present invention taken along its length;

FIG. 4 is a cross-sectional view of the end cap of the present invention taken along its length;

FIG. 5 is a cross-sectional view of the collet lock of the present invention taken along its length;

FIG. 6 is a cross-sectional view of the reducer sleeve of the present invention taken along its length; and FIG. 7 is an end view of the present invention looking into the bore of the collet.

DETAILED DESCRIPTION OF THE PREFERRED EMBODIMENT

Figure 1:
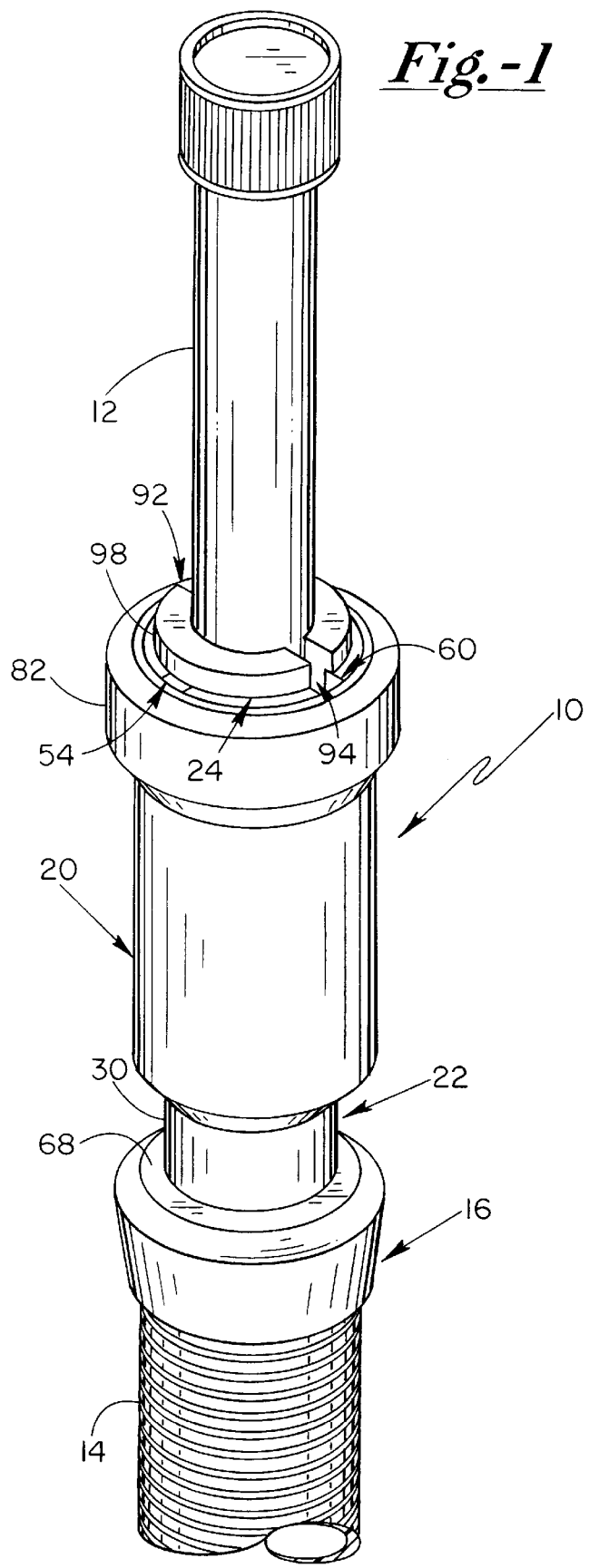
FIG. 1 is a perspective view of the present invention.

The present invention is a collet assembly designated 10 in FIG. 1. The collet assembly 10 is used to secure a first object, such as the flashlight 12 shown in FIG. 1, to a second object, such as the tubular member 14 shown in FIG. 1. Turning now to FIG. 2, the collet assembly 10 includes collet end cap 16 securing a first half 18 of the collet assembly 10 to the tubular member 14, a collet lock 20 surrounding the exterior of a second half 22 of collet assembly 10 and a collet sleeve 24 positioned within the second half 22.

The collet assembly 10 is a generally tubular member and, as seen in FIGS. 2 and 3, it has four segments 26, 28, 30 and 32, each with a different cross-sectional area. It is preferably integrally formed and preferably made from a suitable plastic material. The cross-sectional areas increase in size from the smallest segment 26 at a first end 34 to the largest segment 32 at second end 36. The two smaller segments 26 and 28 form a plug 38. The plug 38 is used to secure collet assembly 10 to the tubular member 14 as shown in FIG. 2 and as will be explained in further detail later. A bore 40 open at end 34 extends through the center of the plug 38 and stops adjacent to segment 30. The exterior of plug 38 includes a tapered surface 44 at the junction of segment 26 and segment 28.

The two larger segments 30 and 32 of the collet assembly 10 form a collet 46. The exterior of collet 46 includes a shoulder 48 formed at the enlargement between segment 28 and segment 30 and a shoulder 50 formed at the enlargement between segments 30 and 32. As seen in FIGS. 2 and 3, the largest segment 32 comprises approximately ¾ of the collet 46. Collet 46 includes a bore 42 which extends from an opening at the second end 36 into segment 30. The bore 42 changes cross-sectional area at the junction of segments 30 and 32 forming an internal shoulder 52. Collet 46 includes four longitudinal slots which extend from the exterior surface 45 of the collet 46 into the collet bore 42 and designated 54, 56, 58 and 60. Slots 54, 56, 58 and 60 are evenly spaced around the collet 46 and they extend substantially ¾ of the length of segment 32 from end 36.

End cap 16, shown in FIGS. 1, 2 and 4 is used for securing the plug 38 to the tubular member 14. A channel 62 is formed in the end cap 16 and is open to a first end 64 of end cap 16. Passageway 66 extending through end cap 60 enlarges at a second end 68 forming a shoulder 70. As seen in FIG. 2, passageway 66 is sized to accommodate the plug 38 with a friction fit. Segment 26 extends into the passageway 66 contacting shoulder 48 with shoulder 70. Segment 26 extends into an interior passageway 72 formed in an inner bead 73 of tubular member 14. The plug bore 40 enables it to be compressed to insure a tight fit. The outer covering 76 of tubular member 14 is press fit into channel 62 of end cap 16. An adhesive may be used in channel 62 to create a water tight seal.

Tubular collet lock 20 surrounds the collet 46 as seen in FIGS. 1 and 2. Its first opening 74 at its first end 76 contains a rim 78. Opening 74 is slightly larger than the exterior perimeter of segment 30, allowing it to be slid along the perimeter of segment 30. Rim 78 forms an interior shoulder 80. An exterior shoulder 82 is formed on end second 84 of the collet lock. As seen in FIG. 2, the first opening 74 is positioned over segment 30. The collet lock opening 74 slides between the end cap 16 and shoulder 50. The collet lock 20 has a tapered cross-sectional area. Second end 84 is larger than its first end 76. However, the collet lock taper is less than the taper of segment 32 over which the collet lock 20 slides.

Turning now to FIG. 6, collet sleeve 24 has a first end 88 which is inserted with a friction fit into the collet bore 42 and contacts shoulder 52. The collet sleeve has two longitudinal slots 92 and 94 oriented opposite each other. The slots 92 and 94 extend approximately half way along the length of the sleeve 24 from its second end 96 towards the first end 88 and are open to the sleeve 24 interior. The second end 96 includes an exterior rim 98. When the sleeve 24 is inserted into collet bore 42, rim 98 contacts the outer edge 100 of the collet 46. The sleeve 24 does not have a taper.

The collet assembly is used by first inserting the collet plug 38 into the tubular member 14 in the manner shown in FIG. 2. The collet lock 20 is positioned in an unlocked position with its opening 74 adjacent to end cap 16. The object to be secured, such as the flashlight 12, is inserted into the collet sleeve 24. The collet lock 20 is then slid towards the flashlight 12 and as this occurs its tapered passageway 102 acts as a camming surface since the taper of the collet lock 20 passageway 102 is less than the taper of the exterior perimeter of collet 46. The collet slots 54, 56, 58 and 60 enable the collet 46 to compress. Likewise, collet sleeve slots 92 and 94 enable the collet sleeve 24 to compress.

The collet lock 20 is moved until it can no longer compress the collet 46 and the collet sleeve 24 against the first object 12. The collet lock 20 is held in the locked position with friction. Shoulder 82 provides a thumb or finger hold in the manual operation of the collet lock 20 between its locked and unlocked position. The object held is released by moving the collet lock 20 to its unlocked position where its rim 78 contacts the end cap 16. Alternatively, the collet lock taper and the collet taper can be reversed. In other words, the larger collet and collet lock diameter can be near the midpoint of the collet assembly. In such an arrangement, the collet lock is slid towards end cap 16 to lock the object therein and it is slid in the opposite direction to release the object.

The sliding lock arrangement of the collet assembly 10 allows various cross sectional areas of objects to be received and secured in the collet 46 since the locked position varies upon the size of the object held in the collet. Further, a collet sleeve is not necessary to use the assembly and alternatively various sized collet sleeves can be used with different sized passageways to accommodate a variety of different sized objects.

This invention has been described herein in considerable detail in order to comply with the patent statutes and to provide those skilled in the art with the information needed to apply the novel principals and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A collet assembly comprising:
   a. a tubular body having a first end and a second end;
   b. coupling means on said first tubular body end for coupling said first tubular body end to a first object, said coupling means further comprising a plug and a cap frictionally receivable therearound;
   c. a collet on said second tubular body end, said collet having a first collet end adjacent said coupling means and a second collet end opposite said coupling means, a bore extending through said collet and open at said second collet lend for receiving a second object, said collet having a first cross-sectional area at its second collet end tapering to second cross-sectional area at its first collet end;
   d. a first plurality of longitudinal slots extending from said second collet end;
   e. a tubular collet lock having a first collet lock end, a second collet lock end and a passageway for receiving said collet therethrough, said passageway having a first cross-sectional area at said first collet lock end tapering to a second cross-sectional area at said second collet lock end, whereby said collet lock taper is less than said collet taper.

2. A collet assembly of claim 1 and further comprising a collet sleeve received in said collet bore, said collet sleeve having a first collet sleeve end positioned within said collet bore and a second collet sleeve end positioned approximate said opening of said collet bore and a second plurality of longitudinal slots extending from said second collet sleeve end.

3. A collet assembly comprising:
   a. a generally tubular body having a first tubular body end and a second tubular body end, a cross-sectional area of said tubular body increasing from said first tubular body end to said second tubular body end;

b. coupling means on said first tubular body end for coupling said tubular body to a first object, said coupling means further comprising a plug and a cap frictionally receivable therearound;

c. a collet on said second tubular body end, saied collet having a first collet end adjacent said coupling means and a second collet end opposite said coupling means, a bore extending through said collet and open at said second collet end for receiving a second object and a first plurality of longitudinal slots extending from said second collet end;

d. a moveable tubular collet lock having a first collet lock end, a second collet lock end and a passageway for receiving said collet therethrough, said first collet lock end positioned intermediate said first and second tubular body ends, said passageway having a first cross-sectional area at said first collet lock end increasing to a second cross-sectional area at said second collet lock end, whereby said collet lock is moveable between an unlocked positioni and a locked position wherein said collet lock passageway compresses said collet against said second object positioned in said collet bore.

4. A collet assembly of claim 3 and further comprising a removable collet sleeve received in said collet bore, said collet sleeve having a first collet sleeve end adjacent a closed end of said collet bore and a second collet sleeve end approximate said opening of said collet bore and a second plurality of longitudinal slots extending from said second collet sleeve end whereby said second object is received in said collet sleeve and said collet sleeve is compressed against said second object when said collet lock is in said locked position.

5. A collet assembly comprising:

a. a tubular body having a first end and a second end;

b. coupling means on said first tubular body end for coupling said first tubular body end to a first object, said coupling means further comprising a plug and a cap frictionally receivable therearound;

c. a collet on said secnd tubular body end, said collet having a first collet end adjacent said coupling means and a second collet end opposite said coupling means, a bore extending through said collet and open at said second collet end for receiving a second object, said collet having a first cross-sectional area at its second collet end changing to second cross-sectional area at its first collet end;

d. a first plurality of longitudinal slots extending from said second collet end;

e. a tubular collet lock having a first collet lock end, a second collet lock end and a passageway for receiving said collet therethrough, said passageway having a first cross-sectional area at said first collet lock end changing to a second cross-sectional area at said second collet lock end.

6. A collet assembly of claim 5 and further comprising a collet sleeve received in said collet bore, said collet sleeve having a first collet sleeve end positioned within said collet bore and a second collet sleeve end positioned approximate said opening of said collet bore and a second plurality of longitudinal slots extending from said second collet sleeve end.

* * * * *